United States Patent
Park et al.

(10) Patent No.: US 8,896,233 B2
(45) Date of Patent: Nov. 25, 2014

(54) SYSTEM AND METHOD FOR CONTROLLING SOLAR CELL LIGHTING APPARATUS

(71) Applicant: LG Chem, Ltd., Seoul (KR)

(72) Inventors: Jong-Min Park, Daejeon (KR); Jong-Kyung Ko, Daejeon (KR); Gyu-Yeol Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/258,943

(22) Filed: Apr. 22, 2014

(65) Prior Publication Data

US 2014/0225533 A1    Aug. 14, 2014

Related U.S. Application Data

(63) Continuation of application No. PCT/KR2013/009576, filed on Oct. 25, 2013.

(30) Foreign Application Priority Data

Oct. 30, 2012  (KR) .................. 10-2012-0121360

(51) Int. Cl.
*H05B 37/02* (2006.01)
*F21S 9/03* (2006.01)

(52) U.S. Cl.
CPC .............. *H05B 37/02* (2013.01); *F21S 9/035* (2013.01)
USPC ........................ 315/307; 320/127; 320/101

(58) Field of Classification Search
USPC ........ 315/307; 324/426, 16, 23; 320/123, 134
See application file for complete search history.

(56) References Cited

FOREIGN PATENT DOCUMENTS

| JP | 2011-45188 A | 3/2011 |
|---|---|---|
| KR | 10-2005-0066403 A | 6/2005 |
| KR | 10-2006-0011803 A | 2/2006 |
| KR | 10-0877298 B1 | 1/2009 |
| KR | 10-1049403 B1 | 7/2011 |

OTHER PUBLICATIONS

International Search Report, issued in PCT/KR2013/009576, dated Jan. 27, 2014.
Written Opinion of the International Searching Authority, issued in PCT/KR2013/009576, dated Jan. 27, 2014.

*Primary Examiner* — Douglas W Owens
*Assistant Examiner* — Monica C King
(74) *Attorney, Agent, or Firm* — Birch, Stewart, Kolasch & Birch, LLP

(57) ABSTRACT

The control system according to the present disclosure integratedly manages a plurality of solar cell lighting apparatuses, each solar cell lighting apparatus including a light emitting source to emit light by a discharge power of a secondary battery and a control unit to adjust a magnitude of the discharge power, and includes a main control unit to collect charge capacity information of each of the secondary batteries included in the plurality of solar cell lighting apparatuses from the control unit of each of the plurality of solar cell lighting apparatuses, determine at least one solar cell lighting apparatus needed to control a light intensity based on the charge capacity collected from the secondary batteries, and output a light intensity control signal to the control unit of the determined solar cell lighting apparatus, to achieve charge capacity balancing of the secondary batteries.

20 Claims, 6 Drawing Sheets

SYSTEM AND METHOD FOR CONTROLLING SOLAR CELL LIGHTING APPARATUS

CROSS-REFERENCE TO RELATED APPLICATION

The present application is a continuation of International Application No. PCT/KR2013/009576 filed on Oct. 25, 2013, which claims priority under 35 USC 119(a) to Korean Patent Application No. 10-2012-0121360 filed in the Republic of Korea on Oct. 30, 2012, the disclosures of which are incorporated herein by reference.

TECHNICAL FIELD

The present disclosure relates to a system and method for controlling a solar cell lighting apparatus, and more particularly, to a system and method for controlling a charge capacity equalization operation of a secondary battery included in a solar cell lighting apparatus.

BACKGROUND ART

With increasing energy consumption, the world is speeding up the development of an alternative energy source that is eco-friendly and offers unlimited resources in replace of traditional energy sources, such as coal, oil, nuclear, and the like, that are exhaustible and have environmental issues.

Such alternative energy sources include solar, wind, wave, geo-thermal, and the like, and various studies are being made to apply these new energy sources in real life. Among them, solar power is the most representative alternative energy source used in daily life, and has widespread applications ranging from a home solar power generator to a solar cell light fixture.

In particular, a solar cell light fixture is an application of a solar power generation system that converts solar energy to electrical energy using a solar cell, stores the electrical energy converted from the solar energy in a secondary battery during the day, and uses the stored electrical energy as a power source of the solar cell lighting apparatus at night. The solar cell light fixture is gaining popularity for its easy installation, low installation and maintenance costs, and no need for electrical cable laying, in areas difficult to bury and wire electrical lines such as seashores, mountaintop, farmlands, hiking trails, and the like, areas requiring special considerations for environmental protection such as tourist spots, theme parks or amusement parks, research facilities, and the like, or areas requiring aesthetic considerations such as parks, walking trails, gardens, grave sites, and the like. Examples of a solar cell light fixture include a landscape light, a street light, a security light, and the like.

However, since a solar cell light fixture is designed to obtain power from solar energy, it is incapable of power charging during the night, rain/snow, and gloomy days when the sun doesn't shine. Therefore, a dimming control based on a charge capacity of a secondary battery is necessary. Further, a charge capacity of a secondary battery may be different for each solar cell light fixture. For example, if solar cell light fixtures are installed in an area near a building, an amount of energy stored in a secondary battery may be different for each solar cell light fixture due to shadow casting by the tall buildings. Accordingly, to achieve a uniform charge capacity, balancing the charge capacities of the secondary batteries by calculating an operation time of each of the solar cell light fixtures is needed.

There are many methods for balancing charge capacity of secondary batteries. A typical example is a method that adds a boost circuit or a buck circuit for each secondary battery, and charges a secondary battery having a relatively low charge capacity or discharges a secondary battery having a relatively high charge capacity.

The charge capacity balancing method of adding the buck circuit has advantages of being simple to configure the buck circuit including a resistance element, and being cost efficient and easy to control. However, a disadvantage is that energy stored in a secondary battery having a relatively high charge capacity is discarded through discharging rather than being used to achieve charge capacity balancing. In contrast, the charge capacity balancing method of adding the boost circuit is advantageous in that balancing is accomplished at a generally high level of charge since the charge of a secondary battery having a relatively low charge capacity may increase. However, there are drawbacks in that the boost circuit is more expensive than the buck circuit and is difficult to control. Accordingly, an appropriate secondary battery balancing method for a solar cell light fixture is required.

DISCLOSURE

Technical Problem

The present disclosure is designed to solve the problems of the related art, and therefore the present disclosure is directed to providing a system and method for controlling the charge capacity balancing of a secondary battery included in a solar cell lighting apparatus.

Technical Solution

To achieve the object, a system for controlling a solar cell lighting apparatus according to the present disclosure integratedly manages a plurality of solar cell lighting apparatuses, each solar cell lighting apparatus including a light emitting source to emit light by a discharge power of a secondary battery and a control unit to adjust a magnitude of the discharge power, and the system includes a main control unit to collect charge capacity information of each of the secondary batteries included in the plurality of solar cell lighting apparatuses from the control unit of each of the plurality of solar cell lighting apparatuses, determine at least one solar cell lighting apparatus needed to control a light intensity based on the charge capacity collected from the secondary batteries, and output a light intensity control signal to the control unit of the determined solar cell lighting apparatus, to achieve charge capacity balancing of the secondary batteries.

According to an embodiment of the present disclosure, the main control unit determines a solar cell lighting apparatus including a secondary battery having a higher charge capacity than a preset reference charge capacity as the solar cell lighting apparatus needed to increase the light intensity, and outputs the light intensity control signal for directing an increase in light intensity to the control unit of the determined solar cell lighting apparatus.

Preferably, the main control unit may output, to the control unit of the determined solar cell lighting apparatus, the light intensity control signal for directing an increase in light intensity in proportion to a difference between the reference charge capacity and the charge capacity of the secondary battery of the determined solar cell lighting apparatus.

According to another embodiment of the present disclosure, when a solar cell lighting apparatus including a secondary battery having a lower charge capacity than a preset reference charge capacity is close to the solar cell lighting apparatus determined to increase the light intensity, the main control unit determines the solar cell lighting apparatus including the secondary battery having the lower charge capacity than the preset reference charge capacity as the solar cell lighting apparatus needed to decrease the light intensity, and outputs the light intensity control signal for directing a decrease in light intensity to the control unit of the determined solar cell lighting apparatus.

Preferably, the main control unit may output, to the control unit of the determined solar cell lighting apparatus, the light intensity control signal for directing a decrease in light intensity in proportion to a difference between the reference charge capacity and the charge capacity of the secondary battery of the determined solar cell lighting apparatus, or may output, to the control unit of the solar cell lighting apparatus determined to decrease the light intensity, the light intensity control signal for decreasing the light intensity of the solar cell lighting apparatus determined to decrease the light intensity in proportion to the increased light intensity of the adjacent solar cell lighting apparatus.

According to still another embodiment of the present disclosure, the main control unit collects extent of degradation information of each of the secondary batteries included in the plurality of solar cell lighting apparatuses from the control unit of each of the solar cell lighting apparatuses, and controls the light intensity of each of the solar cell lighting apparatuses in consideration of both the charge capacity and the extent of degradation for each of the secondary batteries included in the solar cell lighting apparatuses.

According to yet another embodiment of the present disclosure, the main control unit receives weather information from an external server, and controls the light intensity of each of the solar cell lighting apparatuses in consideration of both the weather information and the charge capacity for each of the secondary batteries included in the solar cell lighting apparatuses. The weather information may include information about sunrise/sunset time, sunless day, or moonlight.

According to further another embodiment of the present disclosure, each of the solar cell lighting apparatuses further comprises a light intensity sensor. In this case, the main control unit collects light intensity information sensed by the light intensity sensor from the control unit of each of the solar cell lighting apparatuses, and controls the light intensity of each of the solar cell lighting apparatuses in consideration of both the collected light intensity information and the charge capacity for each of the secondary batteries included in the solar cell lighting apparatuses.

To achieve the object, a method of controlling a solar cell lighting apparatus according to the present disclosure integratedly controls a plurality of solar cell lighting apparatuses connected to one another via a communication network, each solar cell lighting apparatus including a light emitting source to emit light by a discharge power of a secondary battery and a control unit to adjust a magnitude of the discharge power, and the method includes (a) receiving charge capacity information of each of the secondary batteries included in the plurality of solar cell lighting apparatuses from the control unit of each of the solar cell lighting apparatus, (b) determining at least one solar cell lighting apparatus needed to control a light intensity using the charge capacity information, and (c) outputting a light intensity control signal for directing an increase or decrease in light intensity to the control unit of the determined solar cell lighting apparatus.

Advantageous Effects

According to one aspect of the present disclosure, charge capacity balancing of a secondary battery may be performed using characteristics of a lighting apparatus. Accordingly, there is no need for a separate buck circuit, and having to throw away energy stored in a secondary battery rather than making use of it may be prevented.

According to another aspect of the present disclosure, more efficient charge capacity balancing may be achieved by not only increasing the light intensity but also controlling to lower a light intensity in association with an increased light intensity of an adjacent lighting apparatus.

According to still another aspect of the present disclosure, more efficient charge capacity balancing may be achieved by controlling a light intensity of a lighting apparatus in consideration of an extent of degradation of a secondary battery or ambient brightness in an area in which the lighting apparatus is installed.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
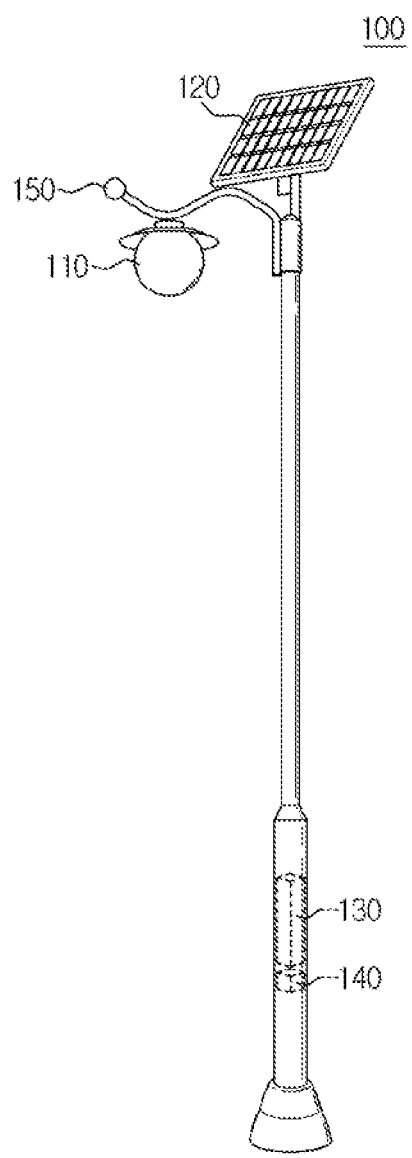
FIG. 1 is a diagram illustrating an example of a configuration of a solar cell street light.

FIG. 1 is a diagram illustrating an example of a configuration of a solar cell street light.

The solar cell street light shown in FIG. 1 is just an example of a solar cell lighting apparatus, hereinafter referred to as a lighting apparatus, that may be controlled by a system for controlling a solar cell lighting apparatus according to the present disclosure, hereinafter referred to as a control system.

Accordingly, it should be understood that a target of control by the control system according to the present disclosure is not limited to the embodiment of FIG. 1.

Referring to FIG. 1, the lighting apparatus 100 includes a light emitting source 110, a solar cell 120, a secondary battery 130, and a control unit 140.

The light emitting source 110 is an electrical device that converts electrical energy to light energy, and includes, for example, but is not limited to, an incandescent lamp, a fluorescent lamp, a halogen lamp, a light emitting diode (LED), and the like. The light emitting source 110 emits light by the discharge power of the secondary battery 130.

The solar cell 120 is a device that converts solar energy to electrical energy. The solar cell is constructed by joining a P-type semiconductor and an N-type semiconductor, and creates electrons and holes when the solar cell absorbs sunlight. In this instance, power is generated by a potential difference between the P-type semiconductor and the N-type semiconductor. The solar cell is widely known in the art pertaining to the present disclosure, and thus a detailed description of a principle and a configuration of the solar cell is omitted herein.

The secondary battery 130 stores the electrical energy generated from the solar cell 120 in a chemical form. Also, when power supply to the light emitting source 110 is needed, the secondary battery 130 converts chemical energy to electrical energy and supplies power.

The secondary battery 130 may include at least one cell to meet the required charge/discharge capacity and output voltage. In this instance, the cell is not limited to a special type. The secondary battery 130 may include a lithium ion battery, a lithium polymer battery, a Ni—Cd battery, a Ni-MH battery, a Ni—Zn battery, and the like, that is rechargeable and requires consideration of a charge or discharge voltage. However, the present disclosure is not limited by a cell type, an output voltage, a charge capacity, and the like.

The control unit 140 may measure the voltage and current of the secondary battery 130. For this, the control unit 140 may include a voltage measurement device to measure the voltage of the secondary battery 130 and a current measurement device to measure the current of the secondary battery. The voltage of the secondary battery refers to an output voltage of the secondary battery 130, and may be measured during charging or discharging of the secondary battery but may be measured as an open circuit voltage (OCV) while charging and discharging is not being performed. Meanwhile, the current of the secondary battery is measured during charging or discharging of the secondary battery.

Also, the control unit 140 may further include a memory. The memory is a high-capacity storage medium such as a semiconductor device or hard disk that is known as being capable of recording and erasing data, for example, random access memory (RAM), read-only memory (ROM), electrical erasable programmable read-only memory (EEPROM), and the like, and encompasses any device capable of storing information regardless of a device type and is not limited to a specific memory device.

The control unit 140 may store the measured voltage and current of the secondary battery 130 in the memory. Also, the control unit 140 may calculate a charge power and a discharge power using the measured voltage and current, and may calculate a charge power level, a discharge power level, and a current state of charge by accumulating the calculated charge power and discharge power. In this instance, the calculated charge power level, discharge power level, and current state of charge may be also stored in the memory. Various methods of calculating the charge power level, the discharge power level, and the current state of charge are known in the art pertaining to the present disclosure. Typically, the charge power level, the discharge power level, and the current state of charge may be calculated using an Ampere counting method. Meanwhile, the control unit 140 may include a function of a battery management system (BMS) that can be applied at the level of an ordinary skill in the art, including measurement of electrical characteristics except the voltage or current of the secondary battery 130, charge/discharge control, voltage equalization control, state of charge (SOC) estimation, and the like.

Figure 2:
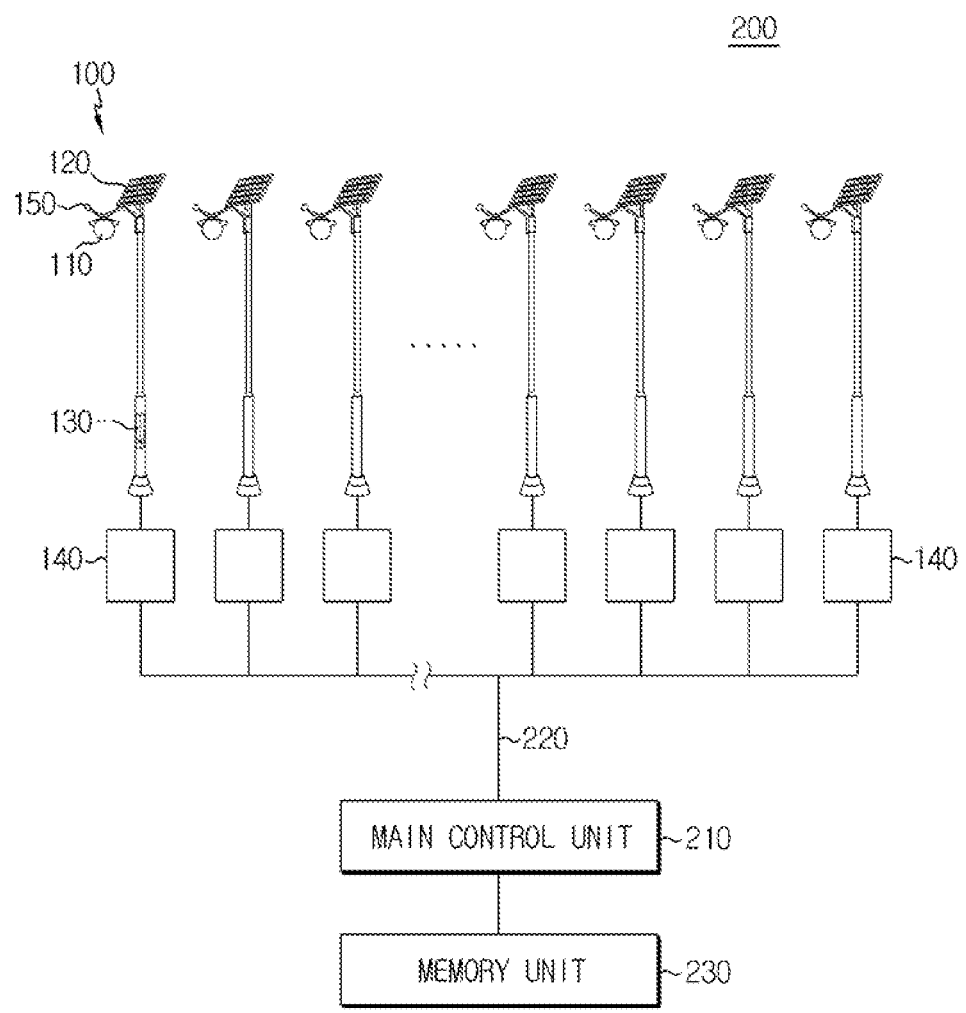
FIG. 2 is a block diagram schematically illustrating a configuration of a control system according to an exemplary embodiment of the present disclosure.

FIG. 2 is a block diagram schematically illustrating a configuration of a control system 200 according to an exemplary embodiment of the present disclosure.

The control system 200 according to the present disclosure includes a main control unit 210 connected to the control unit 140 for each lighting apparatus 100.

The control unit 140 of the lighting apparatus 100 and the main control unit 210 are connected via a communication network 220. The communication network 220 of FIG. 2 is illustrated as a type of a parallel communication network, however this is not intended to leave a series communication network out of consideration. Accordingly, the communication network 220 may be a daisy chain. The daisy chain refers to a bus wiring scheme in which multiple devices are wired together in sequence. Further, the communication network 220 may be a communication network using a wireless communication scheme. That is, the communication network 220 corresponds to a communication network used to transmit and receive data, and includes all communication networks implemented by a general communication technology widely known to a person having an ordinary skill in the art at the time of filing the present disclosure.

The main control unit 210 and the control unit 140 of the lighting apparatus transmit and receive data via the communication network 220. For this, the main control unit 210 and the control unit 140 of the lighting apparatus may form a communication interface with a data communication device, and may include a communication logic complying with a communication protocol.

The main control unit 210 receives charge capacity data of the secondary battery 130 included in the lighting apparatus 100 from the control unit 140 for each lighting apparatus 100. Also, the main control unit 210 outputs a control signal for charge capacity balancing of the secondary battery 130 using the charge capacity data. In this instance, the control signal outputted from the main control unit 210 corresponds to a signal for controlling a light intensity of the light emitting source 110 for each lighting apparatus 100.

Generally, when an identical electrical device is used as a light emitting source of a lighting apparatus, the higher the light intensity is, the higher the amount of power consumption of the light emitting source. That is, it is possible to adjust an amount of power consumption of a light emitting source by controlling a light intensity. To increase a light intensity of a light emitting source, voltage and/or current may be increased, however it is preferred to increase a light intensity of a light emitting source by increasing an amount of current. For example, an amount of current being supplied may be changed using a variable resistance connected to the light emitting source 110, but there are various methods of adjusting an amount of current.

The control system 200 according to the present disclosure controls the light intensity of the light emitting source 110 for charge capacity balancing of the secondary battery 130. That is, the present disclosure does not use a conventional method for charge capacity balancing using a duck circuit that involves inefficient energy consumption, but allows charge capacity balancing of a secondary battery through controlling a light intensity using characteristics of a lighting apparatus including a light emitting source.

According to the embodiment of the present disclosure, the main control unit 210 outputs a control signal for increasing the light intensity of the light emitting source 110 to the control unit 140 of the lighting apparatus 100 including the secondary battery 130 having a higher charge capacity than a preset reference charge capacity.

A predetermined level of power required to charge the secondary battery 130 may be set based on an area in which the lighting apparatus 100 is installed, a purpose of use, a power consumption amount, and the like. That is, the lighting apparatus 100 has a charge capacity required to emit light of a desired intensity for a desired period of time by a user. In the specification, such a charge capacity is referred to as a reference charge capacity.

The reference charge capacity may be set by a user, but may be also set by the main control unit 210. The main control unit 210 receives charge capacity information of the secondary battery 130 from the control unit 140 for each solar cell lighting apparatus. Also, the reference charge capacity may be set using the received charge capacity information for each secondary battery 130. For example, the reference charge capacity may be an average value of the charge capacities of the secondary batteries. As another example, a charge capacity of a secondary battery having a lowest charge capacity among the received charge capacities of the secondary batteries 130 may be set as the reference charge capacity.

An amount of power produced through the solar cell 120 during the day may be different for each lighting apparatus 100. Also, even though an amount of generated power is the same, an amount of stored power may be different based on characteristics or an extent of degradation of a secondary battery. In particular, some solar cells 120 may produce a greater amount of power than the reference charge capacity, or some secondary batteries 130 may store a greater amount of power than the reference charge capacity. Accordingly, there is a need for charge capacity balancing by allowing the lighting apparatus 100 including a secondary battery having a higher charge capacity than the reference charge capacity to consume a greater amount of power than the other lighting apparatus. For this, the main control unit 210 outputs a control signal for increasing a light intensity of the lighting apparatus 100 including the secondary battery 130 having a higher charge capacity than the reference charge capacity to the control unit 140 of the corresponding lighting apparatus 100.

Preferably, the main control unit 210 outputs a control signal for directing an increase in light intensity in proportion to a difference between the reference charge capacity and the charge capacity of the secondary battery of the determined solar cell lighting apparatus to the control unit 140 of the corresponding lighting apparatus. That is, as an amount of charge exceeding the reference charge capacity is greater, the main control unit 210 outputs a control signal for increasing the light intensity to a higher level.

Meanwhile, some solar cells 120 may produce a smaller amount of power than the reference charge capacity, or some secondary batteries 130 may store a smaller amount of power than the reference charge capacity. In this case, it is preferred to reduce a light intensity of the lighting apparatus including the secondary battery 130 having a low charge capacity. However, it is not preferable to just reduce the light intensity depending on a purpose of use of the lighting apparatus 100. For example, if a light intensity of a street light used for the purpose of security reasons is lowered, the original purpose of crime prevention may not be accomplished in some cases.

Accordingly, when a solar cell lighting apparatus including a secondary battery having a lower charge capacity than the reference charge capacity is close to the solar cell lighting apparatus determined to increase the light intensity, the main control unit 210 according to the present disclosure determines a solar cell lighting apparatus including a secondary battery having a lower charge capacity than the reference charge capacity as a solar cell lighting apparatus needed to reduce the light intensity. Also, the main control unit 210 outputs a control signal for reducing the light intensity of the lighting apparatus 100 including the secondary battery 130 having the lower charge capacity than the reference charge capacity to the control unit 140 of the corresponding lighting apparatus 100.

In this instance, the main control unit 210 provides the control unit 140 of the corresponding lighting apparatus 100 with the control signal for reducing the light intensity in proportion to an amount of charge by which the charge capacity of the secondary battery 130 falls short of the reference charge capacity. Also, the main control unit 210 provides the control unit 140 of the corresponding lighting apparatus 100 with the control signal for reducing the light intensity in proportion to the increased light intensity of the adjacent lighting apparatus.

Even if certain lighting apparatuses reduce in light intensity, if adjacent lighting apparatuses are controlled to increase in light intensity, a light intensity suited for a certain purpose of use may be implemented as a whole. Therefore, the present disclosure may achieve charge capacity balancing as well as accomplishing a purpose of use of a lighting apparatus by meeting the required light intensity.

According to another exemplary embodiment of the present disclosure, the main control unit 210 may output a signal for controlling a light intensity for each solar cell lighting apparatus 100 in consideration of an extent of degradation along with the charge capacity for each secondary battery 130.

As the charge and discharge of a secondary battery is repeated, a degradation phenomenon occurs in which a charge capacity gradually reduces and an internal resistance increases. Thus, even an identical secondary battery reduces in a charge capacity as degradation progresses, and although the secondary battery is charged to a same amount of charge, the amount of charge may be consumed more rapidly due to an increased internal resistance. Accordingly, more efficient charge capacity balancing may be achieved by controlling a light intensity in consideration of an extent of degradation for each secondary battery together, rather than by controlling a light intensity using only charge capacity data.

The extent of degradation of the secondary battery may be estimated by the control unit 140 sensing the characteristics of the secondary battery 130, and may also be estimated by the main control unit 210 receiving information about each secondary battery from the control unit 140. Meanwhile, various technologies for estimating the extent of degradation of the secondary battery are well known in the art pertaining to the present disclosure. For example, the extent of degradation of the secondary battery may be estimated by fully charging the secondary battery 130, calculating a full charge capacity (FCC) using an Ampere counting method while discharging to a discharge final voltage, and calculating a relative ratio of the calculated FCC to an initial full charge capacity of the secondary battery 130. However, the present disclosure is not limited by the method of estimating the extent of degradation of the secondary battery 130.

In controlling the light intensity of the lighting apparatus 100, the light intensity may be controlled in consideration of both a surrounding condition of the lighting apparatus 100 as well as the charge capacity or the extent of degradation of the secondary battery 130. That is, when ambient brightness in an installation area of the lighting apparatus 100 is taken into account, a range of light intensity control for charge capacity balancing may be widened.

According to still another exemplary embodiment of the present disclosure, the main control unit 210 receives weather information, and outputs a signal for controlling a light intensity for each solar cell lighting apparatus 100 in consideration of both the weather information and the charge capacity of the secondary battery 130.

The weather information may include information about sunrise and sunset. For example, the lighting apparatus 100 does not need to operate or may reduce in light intensity because the atmosphere reflects back the sunlight immediately after sunset or before sunrise. In this instance, since the sunrise time and sunset time are different with changing seasons, the sunrise and sunset information may be used in calculating an operation time of the lighting apparatus 100. The reference charge capacity may be changed based on the operation time of the lighting apparatus 100. Accordingly, the main control unit 210 may control the light intensity in consideration of the sunrise and sunset information and the charge capacity of the secondary battery 130.

Also, the weather information may include information about sunless day. Sometimes, the sun does not shine during the day depending on latitude, season, weather, and the like. In this instance, a day in which the sun does not shine during the day is called a sunless day. In this case, productivity in power generation using the solar cell 120 and the operation time of the lighting apparatus 100 may change. Similarly, in this case, the reference charge capacity may be changed based on productivity in power generation and the operation time. Accordingly, the main control unit 210 may control the light intensity in consideration of the information about sunless day and the charge capacity of the secondary battery 130.

Also, the weather information may include information about moonlight. The light intensity required at night may be changed with the changing moon. For example, in a case of a full moon, a high light intensity is not required for the lighting apparatus 100, and in a case of a crescent moon, a high light intensity may be required for the lighting apparatus 100. In this case, the charge capacity may be also changed based on moonlight brightness. Accordingly, the main control unit 210 may control the light intensity for each solar cell lighting apparatus 100 in consideration of both the information about moonlight and the charge capacity of the secondary battery 130.

Meanwhile, the lighting apparatus 100 may further include a light intensity sensor 150. In this case, the main control unit 210 according to the present disclosure may control the light intensity for each solar cell lighting apparatus 100 in consideration of both the light intensity information sensed by the light intensity sensor 150 and the charge capacity of the secondary battery 130.

The control system 200 according to the present disclosure may further include a memory unit 230. The memory unit 230 is a high-capacity storage medium such as a semiconductor device or hard disk that is known as being capable of recording and erasing data, for example RAM, ROM, EEPROM, and the like, and encompasses any device capable of storing information regardless of a device type and is not limited to a specific memory device.

The memory unit 230 may store various data related to charge capacity balancing through dimming control such as the reference charge capacity, a lookup table of light intensity increments or decrements based on the charge capacity, the charge capacity for each secondary battery 130, the extent of degradation for each secondary battery 130, the weather information, the light intensity information, and the like.

To execute various control logics described in the foregoing, the main control unit 210 may include a processor, an application-specific integrated circuit (ASIC), other chipsets, a logic circuit, a register, a communication modem, a data processing device, and the like, known in the art pertaining to the present disclosure. Also, when the exemplary control logics are implemented as software, the main control unit 210 may be implemented as an assembly of program modules. In this instance, the program module may be stored in a memory and executed by a processor. Here, the memory may be inside or outside the processor, and connected to the processor by various well-known means. Also, the memory may be inside or outside the memory unit 230. The memory collectively refers to a device used to store information regardless of a device type, and is not limited to a specific memory device.

Hereinafter, a method of controlling a solar cell lighting apparatus according to the present disclosure, hereinafter referred to as a control method, is described in detail with reference to the configuration of the control system 200 described in the foregoing. However, in the description of the control method according to the present disclosure, the configuration of each of the lighting apparatus 100 and the control system 200 is repeated and thus, its detailed description is omitted herein.

Figure 3:
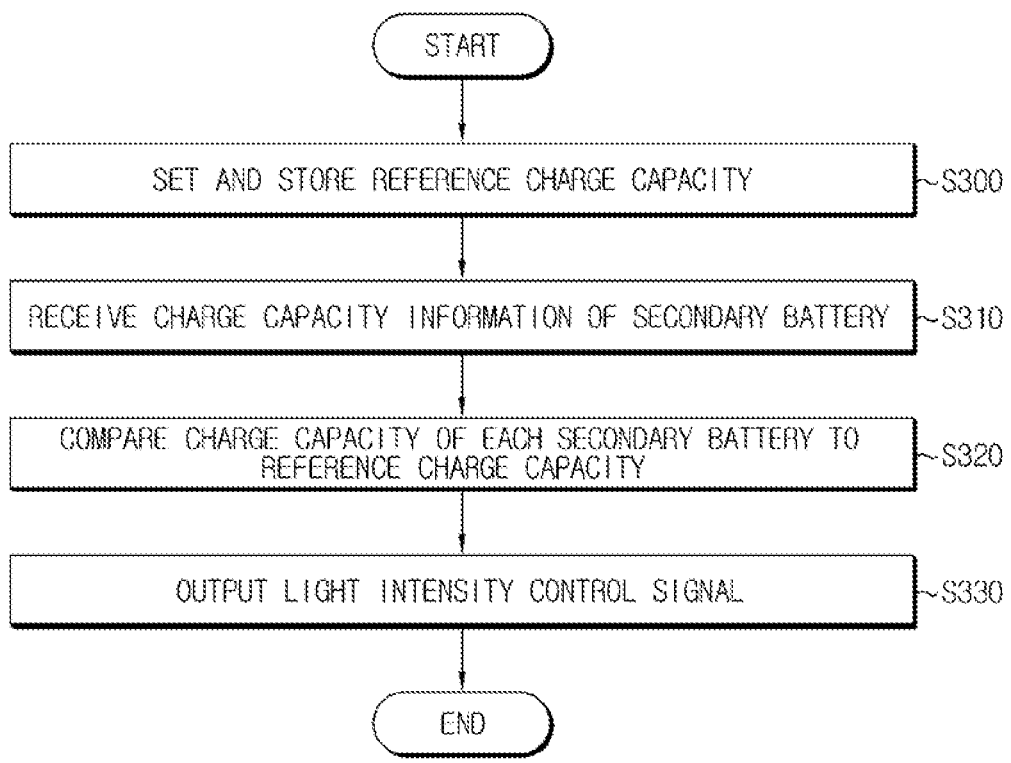
FIG. 3 is a flowchart schematically illustrating a control method according to an exemplary embodiment of the present disclosure.

FIG. 3 is a flowchart schematically illustrating a control method according to an exemplary embodiment of the present disclosure.

First, in S300, the main control unit 210 sets a reference charge capacity required for the lighting apparatus 100, and stores the same in the memory unit 230 of the control system 200. As described in the foregoing, the reference charge capacity may be variously set based on an area in which the lighting apparatus 100 is installed, a purpose of use, and the like. Then, the main control unit 210 ends the process of S300 and proceeds with S310.

In S310, the main control unit 210 receives charge capacity information of the secondary battery 130 from the control unit 140 for each lighting apparatus 100 via the communication network 220. The main control unit 210 stores the received charge capacity information for each secondary battery 130 in the memory unit 230. When the main control unit 210 receives the charge capacity information of the secondary battery 130 from all the lighting apparatuses 100 included in the control system 200, the main control unit 210 ends the process of S310 and proceeds with S320.

In S320, the main control unit 210 compares the charge capacity information for each secondary battery 130 to the reference charge capacity. Also, the main control unit 210 determines the lighting apparatus 100 of which a light intensity should be increased or decreased.

According to the embodiment of the present disclosure, the main control unit 210 determines the lighting apparatus 100 including the secondary battery 130 having a higher charge capacity than the preset reference charge capacity as the lighting apparatus 100 needed to increase the light intensity. Preferably, the main control unit 210 may determine an extent of the increase in light intensity in proportion to an amount of charge exceeding the reference charge capacity.

According to another exemplary embodiment of the present disclosure, when a lighting apparatus including a secondary battery having a lower charge capacity than the preset reference charge capacity is close to the lighting apparatus determined to increase the light intensity, the main control unit 210 may determine the lighting apparatus including the secondary battery having the lower charge capacity than the reference charge capacity as the lighting apparatus needed to reduce the light intensity. In this case, the main control unit 210 may determine to reduce the light intensity of the lighting apparatus in proportion to an amount of charge below the reference charge capacity. Also, the main control unit 210 may determine to reduce the light intensity of the lighting apparatus including the secondary battery having the lower charge capacity than the reference charge capacity in proportion to a light intensity increment of the adjacent lighting apparatus having the increased light intensity.

When it is determined how to control the light intensity of which lighting apparatus the main control unit 210 ends the process of S320, and then proceeds with S330.

In S330, the main control unit 210 outputs a light intensity control signal corresponding to the determination made in S320 to the control unit 140 of the lighting apparatus needed to control the light intensity via the communication network 220. Then, the control unit of the lighting apparatus needed to control the light intensity receives the light intensity control signal and controls the light intensity by adjusting a discharge power supplied from the secondary battery 130 to the light emitting source 110. This light intensity control operation may continue until the charge capacity of the secondary battery 130 included in the lighting apparatus to which the light intensity control signal is provided substantially equals the reference charge capacity. For this, the main control unit 210 may execute a feedback control logic. That is, the main control unit 210 may receive and monitor the charge capacity information of the secondary battery 130 from the control unit 140 of the lighting apparatus periodically during controlling the light intensity, and may continue to output the light intensity control signal to the control unit via the communication network 220 until the charge capacity of the secondary battery 130 substantially reaches the reference charge capacity.

Figure 4:
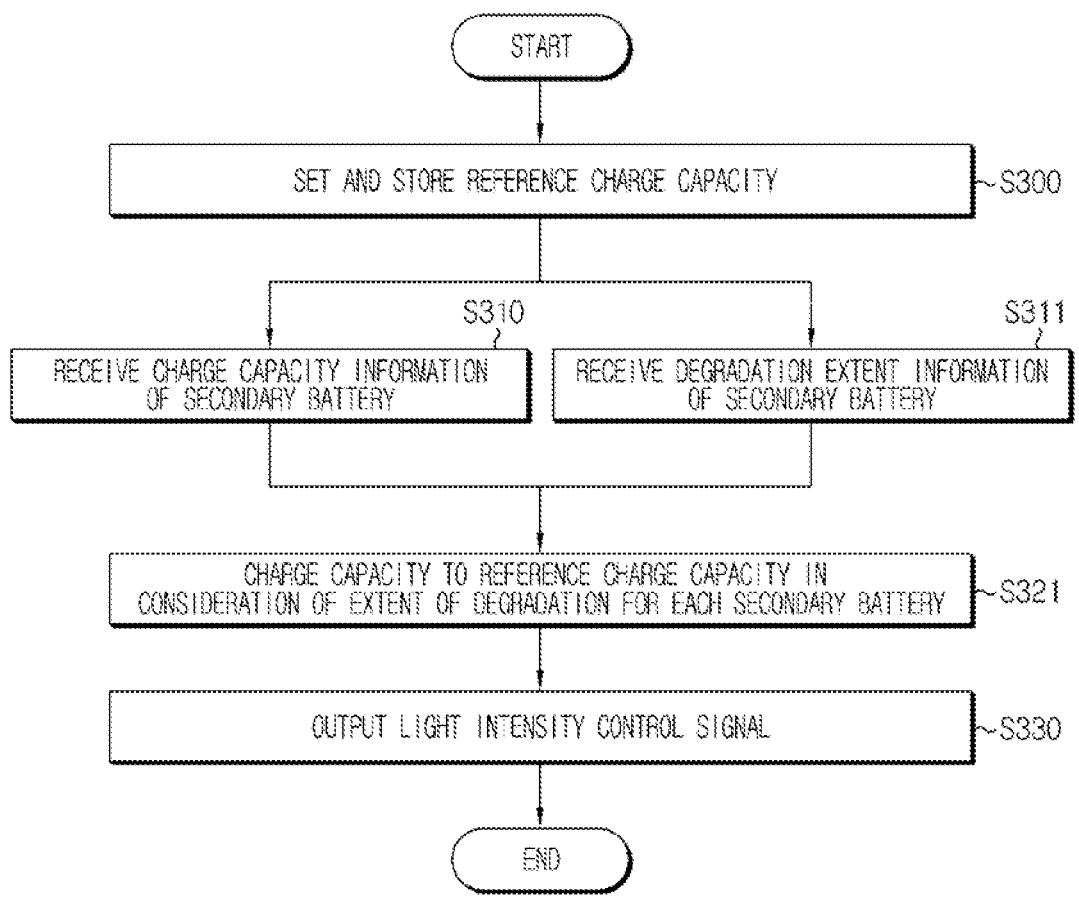
FIG. 4 is a flowchart schematically illustrating a control method according to another exemplary embodiment of the present disclosure.

FIG. 4 is a flowchart schematically illustrating a control method according to another exemplary embodiment of the present disclosure.

Referring to FIG. 4, the method is substantially the same as that of FIG. 3 except that S311 is added and S321 replaces S320. Accordingly, a description of another exemplary embodiment of the present disclosure is provided based on the additional step S311 and the replaced step S321 as follows.

After the main control unit 210 performs the process of S300, in S311, the main control unit 210 receives extent of degradation information for each secondary battery 130 from the control unit 140 for each lighting apparatus 100 via the communication network 220. The extent of degradation information of the secondary battery 130 may correspond to extent of degradation information of the secondary battery estimated by the control unit 140 and may also correspond to a value of electrical characteristic of the secondary battery received from the control unit 140 to estimate the extent of degradation of the secondary battery. A detailed description of a method of estimating the extent of degradation of the secondary battery is provided in the foregoing, and thus a repeated description is omitted herein. When the processes of S310 and S311 are completed, the main control unit 210 passes the process to S321.

In S321, the main control unit 210 determines the lighting apparatus 100 of which a light intensity should be increased or decreased in consideration of both the charge capacity and the extent of degradation for each secondary battery 130. In S330, the main control unit 210 outputs a light intensity control signal to the control unit of the lighting apparatus needed to control the light intensity via the communication network 220.

Figure 5:
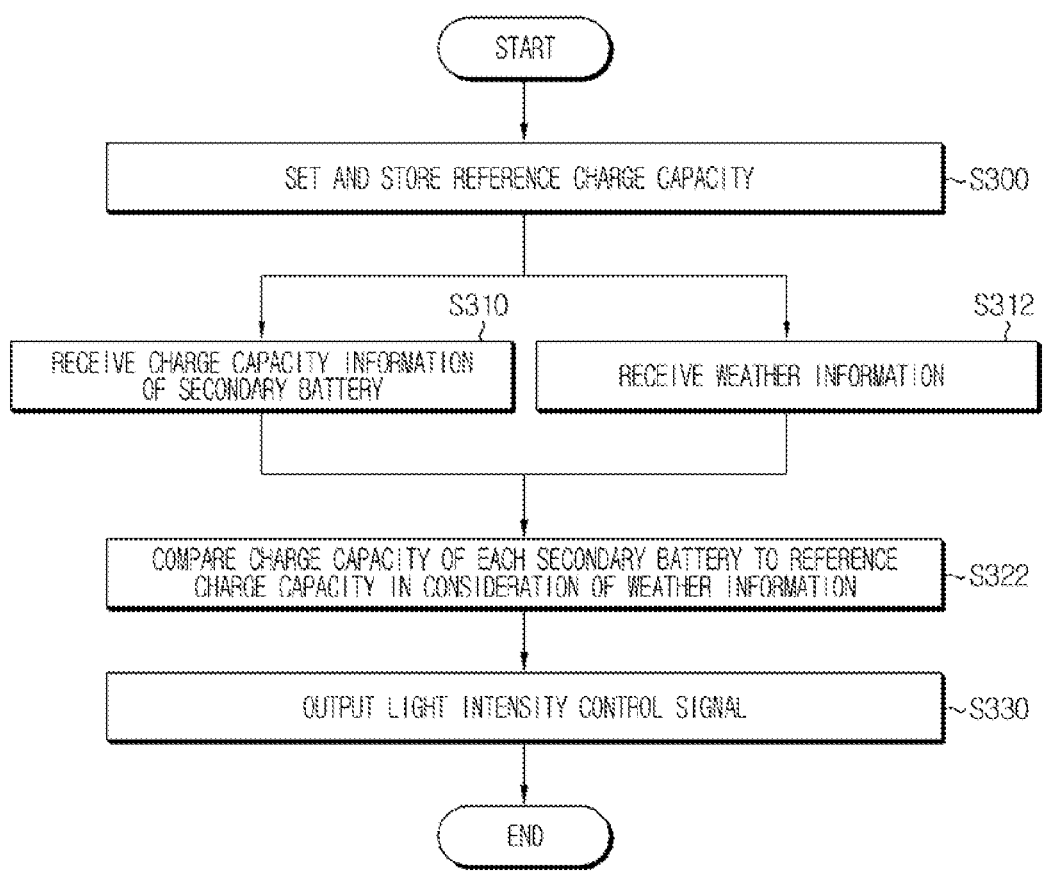
FIG. 5 is a flowchart schematically illustrating a control method according to a still another exemplary embodiment of the present disclosure.

FIG. 5 is a flowchart schematically illustrating a control method according to a still another exemplary embodiment of the present disclosure.

The flowchart of FIG. 5 is substantially the same as that of FIG. 3 except that S312 is added and S322 replaces S320. Accordingly, a description of still another exemplary embodiment of the present disclosure is provided based on the additional step S312 and the replaced step S322 as follows.

In S312, the main control unit 210 receives weather information. The weather information may correspond to information about sunrise/sunset, sunless day, or moonlight. The main control unit 210 may be provided with the weather information periodically from an external server, and the external server may be, as a non-limiting example, a server of a weather center. When S310 and S312 are completed, the main control unit 210 passes the process to S322.

In S322, the main control unit 210 determines the lighting apparatus 100 of which a light intensity should be increased or decreased in consideration of both the charge capacity for each secondary battery 130 and the weather information. Here, a specific content of the weather information and a detailed description of a method of controlling the light intensity based on the weather information are provided in the foregoing, and thus a repeated description is omitted herein. When S322 is completed, in S330, the main control unit 210 outputs a light intensity control signal to the control unit of the lighting apparatus needed to control the light intensity via the communication network 220.

Figure 6:
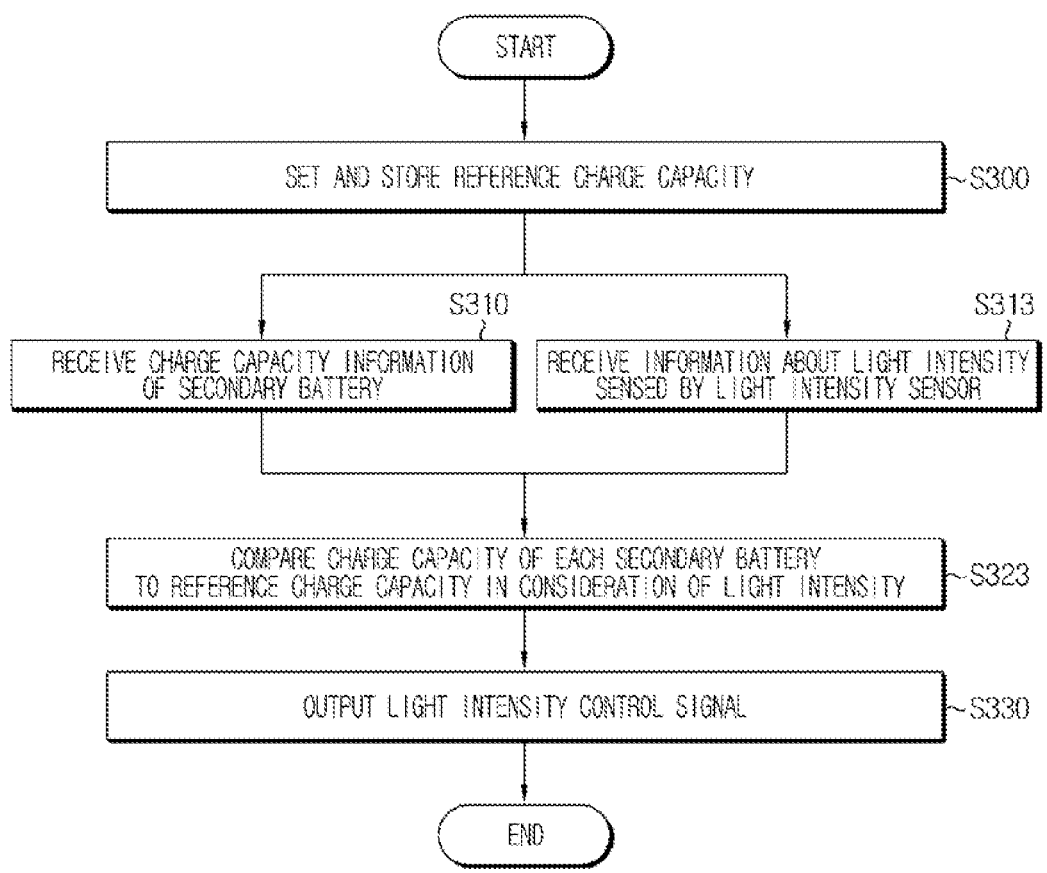
FIG. 6 is a flowchart schematically illustrating a control method according to a yet another exemplary embodiment of the present disclosure.

FIG. 6 is a flowchart schematically illustrating a control method according to a yet another exemplary embodiment of the present disclosure.

The embodiment of FIG. 6 describes a control method applicable to a case in which the light intensity sensor 150 is included in the lighting apparatus 100. The flowchart of FIG. 6 is substantially the same as that of FIG. 3 except that S313 is added and S323 replaces S320. Accordingly, a description of yet another exemplary embodiment of the present disclosure is provided based on the additional step S313 and the replaced step S323 as follows.

In S313, the main control unit 210 receives light intensity information sensed by the light intensity sensor 150 from the control unit 140 for each lighting apparatus 100 via the communication network 220. Then, the main control unit 210 passes the process to S323.

In S323, the main control unit 210 determines the lighting apparatus 100 of which a light intensity should be increased or decreased in consideration of both the charge capacity for each secondary battery 130 and the light intensity information sensed by the light intensity sensor 150. In S330, the main control unit 210 outputs a light intensity control signal to the control unit 130 of the lighting apparatus needed to control the light intensity via the communication network 220.

According to the present disclosure, charge capacity balancing of a secondary battery may be performed using characteristics of a lighting apparatus in which power consumption increases with an increase in light intensity of a light emitting source. Accordingly, there is no need for a separate buck circuit, and having to throw away energy stored in a secondary battery rather than making use of it may be prevented. Also, more efficient charge capacity balancing may be achieved by not only increasing the light intensity but also controlling to lower a light intensity in association with an increased light intensity of an adjacent lighting apparatus. Further, more efficient charge capacity balancing may be achieved by controlling a light intensity of a lighting apparatus in consideration of an extent of degradation of a secondary battery or ambient brightness in an area in which the lighting apparatus is installed.

Meanwhile, in the description of the present disclosure, it should be understood that each element or component of the control system 200 shown in FIGS. 1 and 2 is distinguished logically rather than physically.

That is, each element or component corresponds to a logic element or component to realize the technical spirit of the present disclosure, and accordingly, it should be understood that even though each element or component is integrated or separated, it falls within the scope of the present disclosure if a function performed by a logic element or component of the present disclosure can be implemented, and it falls within the scope of the present disclosure regardless of whether names are identical or not if it is an element or component performing an identical or similar function.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for controlling a solar cell lighting apparatus that integratedly manages a plurality of solar cell lighting apparatuses, each solar cell lighting apparatus including a light emitting source to emit light by a discharge power of a secondary battery and a control unit to adjust a magnitude of the discharge power, the system comprising:
    a main control unit to collect charge capacity information of each of the secondary batteries included in the plurality of solar cell lighting apparatuses from the control unit of each of the plurality of solar cell lighting apparatuses, determine at least one solar cell lighting apparatus needed to control a light intensity based on the charge capacity collected from the secondary batteries, and output a light intensity control signal to the control unit of the determined solar cell lighting apparatus, to achieve charge capacity balancing of the secondary batteries.

2. The system according to claim 1, wherein the main control unit determines a solar cell lighting apparatus including a secondary battery having a higher charge capacity than a preset reference charge capacity as the solar cell lighting apparatus needed to increase the light intensity, and outputs the light intensity control signal for directing an increase in light intensity to the control unit of the determined solar cell lighting apparatus.

3. The system according to claim 2, wherein the main control unit outputs, to the control unit of the determined solar cell lighting apparatus, the light intensity control signal for directing an increase in light intensity in proportion to a difference between the reference charge capacity and the charge capacity of the secondary battery of the determined solar cell lighting apparatus.

4. The system according to claim 2, wherein when a solar cell lighting apparatus including a secondary battery having a lower charge capacity than a preset reference charge capacity is close to the solar cell lighting apparatus determined to increase the light intensity, the main control unit determines the solar cell lighting apparatus including the secondary battery having the lower charge capacity than the preset reference charge capacity as the solar cell lighting apparatus needed to decrease the light intensity, and outputs the light intensity control signal for directing a decrease in light intensity to the control unit of the determined solar cell lighting apparatus.

5. The system according to claim 4, wherein the main control unit outputs, to the control unit of the determined solar cell lighting apparatus, the light intensity control signal for directing a decrease in light intensity in proportion to a difference between the reference charge capacity and the charge capacity of the secondary battery of the determined solar cell lighting apparatus.

6. The system according to claim 4, wherein the main control unit outputs, to the control unit of the solar cell lighting apparatus determined to decrease the light intensity, the light intensity control signal for decreasing the light intensity of the solar cell lighting apparatus determined to decrease the light intensity in proportion to the increased light intensity of the adjacent solar cell lighting apparatus.

7. The system according to claim 1, wherein the main control unit collects extent of degradation information of each of the secondary batteries included in the plurality of solar cell lighting apparatuses from the control unit of each of the solar cell lighting apparatuses, and controls the light intensity of each of the solar cell lighting apparatuses in consideration of both the charge capacity and the extent of degradation for each of the secondary batteries included in the solar cell lighting apparatuses.

8. The system according to claim 1, wherein the main control unit receives weather information from an external server, and controls the light intensity of each of the solar cell lighting apparatuses in consideration of both the weather information and the charge capacity for each of the secondary batteries included in the solar cell lighting apparatuses.

9. The system according to claim 8, wherein the weather information includes information about sunrise/sunset time, sunless day, or moonlight.

10. The system according to claim 1, wherein each of the solar cell lighting apparatuses further comprises a light intensity sensor,
    wherein the main control unit collects light intensity information sensed by the light intensity sensor from the control unit of each of the solar cell lighting apparatuses, and controls the light intensity of each of the solar cell lighting apparatuses in consideration of both the collected light intensity information and the charge capacity for each of the secondary batteries included in the solar cell lighting apparatuses.

11. A method of controlling a solar cell lighting apparatus that integratedly controls a plurality of solar cell lighting apparatuses connected to one another via a communication network, each solar cell lighting apparatus including a light emitting source to emit light by a discharge power of a secondary battery and a control unit to adjust a magnitude of the discharge power, the method comprising:
    (a) receiving charge capacity information of each of the secondary batteries included in the plurality of solar cell lighting apparatuses from the control unit of each of the solar cell lighting apparatus;
    (b) determining at least one solar cell lighting apparatus needed to control a light intensity using the charge capacity information; and
    (c) outputting a light intensity control signal for directing an increase or decrease in light intensity to the control unit of the determined solar cell lighting apparatus.

12. The method according to claim 11, wherein the step (b) comprises determining a solar cell lighting apparatus including a secondary battery having a higher charge capacity than a preset reference charge capacity as the solar cell lighting apparatus needed to increase the light intensity, and the step (c) comprises outputting the light intensity control signal for directing an increase in light intensity to the control unit of the determined solar cell lighting apparatus.

13. The method according to claim 12, wherein the step (c) comprises outputting, to the control unit of the determined solar cell lighting apparatus, the light intensity control signal for directing an increase in light intensity in proportion to a difference between the reference charge capacity and the charge capacity of the determined solar cell lighting apparatus.

14. The method according to claim 12, wherein the step (b) comprises, when a solar cell lighting apparatus including a secondary battery having a lower charge capacity than a preset reference charge capacity is close to the solar cell lighting apparatus determined to increase the light intensity, determining the solar cell lighting apparatus including the secondary battery having the lower charge capacity than the preset reference charge capacity as the solar cell lighting apparatus needed to decrease the light intensity, and the step (c) comprises outputting the light intensity control signal for directing a decrease in light intensity to the control unit of the determined solar cell lighting apparatus.

15. The method according to claim 14, wherein the step (c) comprises outputting, to the control unit of the determined solar cell lighting apparatus, the light intensity control signal for directing a decrease in light intensity in proportion to a difference between the reference charge capacity and the charge capacity of the determined solar cell lighting apparatus.

16. The method according to claim 14, wherein the step (c) comprises outputting, to the control unit of the solar cell lighting apparatus determined to decrease the light intensity, the light intensity control signal for decreasing the light intensity of the solar cell lighting apparatus determined to decrease the light intensity in proportion to the increased light intensity of the adjacent solar cell lighting apparatus.

17. The method according to claim 11, wherein the step (a) comprises further receiving extent of degradation information of each of the secondary batteries included in the plurality of solar cell lighting apparatuses from the control unit of each of the solar cell lighting apparatuses, and the step (b) comprises determining at least one solar cell lighting apparatus needed to control a light intensity in consideration of both the charge capacity information and the extent of degradation information.

18. The method according to claim 11, wherein the step (a) comprises further receiving weather information from an external server, and the step (b) comprises at least one solar cell lighting apparatus needed to control a light intensity in consideration of both the charge capacity information and the weather information.

19. The method according to claim 18, wherein the weather information includes information about sunrise/sunset time, sunless day, or moonlight.

20. The method according to claim 11, wherein each of the solar cell lighting apparatuses further comprises a light intensity sensor, wherein the step (a) comprises further receiving light intensity information sensed by the light intensity sensor from the control unit of each of the solar cell lighting apparatuses, and the step (b) comprises at least one solar cell lighting apparatus needed to control a light intensity in consideration of both the charge capacity information and the light intensity information.

\* \* \* \* \*